United States Patent [19]
Jimenez

[11] 3,766,846
[45] Oct. 23, 1973

[54] APPARATUS FOR PREPARING TACO SHELLS

[76] Inventor: James A. Jimenez, 6252 N. Hart, Temple City, Calif. 91780

[22] Filed: Apr. 13, 1972

[21] Appl. No.: 243,733

[52] U.S. Cl. .......................... 99/353, 99/404, 99/427
[51] Int. Cl. .......................... A47j 37/12, A21b 5/08
[58] Field of Search ...................... 99/353, 352, 349, 99/404, 426, 427

[56] References Cited
UNITED STATES PATENTS

| 2,603,143 | 7/1952 | Saenz | 99/353 |
|---|---|---|---|
| 2,967,474 | 1/1961 | Ford | 99/404 |
| 3,267,836 | 8/1966 | Yepis | 99/404 |
| 3,570,393 | 3/1971 | Schy | 99/404 |
| 3,602,130 | 8/1971 | Perez | 99/404 |

Primary Examiner—Wayne A. Morse, Jr.
Assistant Examiner—Arthur O. Henderson
Attorney—R. Welton Whann et al.

[57] ABSTRACT

An apparatus for preparing taco shells from uncooked tortillas comprising a cooking vessel for containing cooking oil, a conveyor assembly having a plurality of spaced apart generally V-shaped rigid mold members for forming the tortillas and carrying them through the cooking vessel, and a supporting flexible belt-like member disposed proximate the conveyor for supporting the tortillas in juxtaposition with the mold members as the tortilla is moved through the cooking vessel. The conveyor system also includes a unique mechanism for removing the cooked tortillas from the cooking vessel after they have been suitably formed and cooked.

14 Claims, 10 Drawing Figures

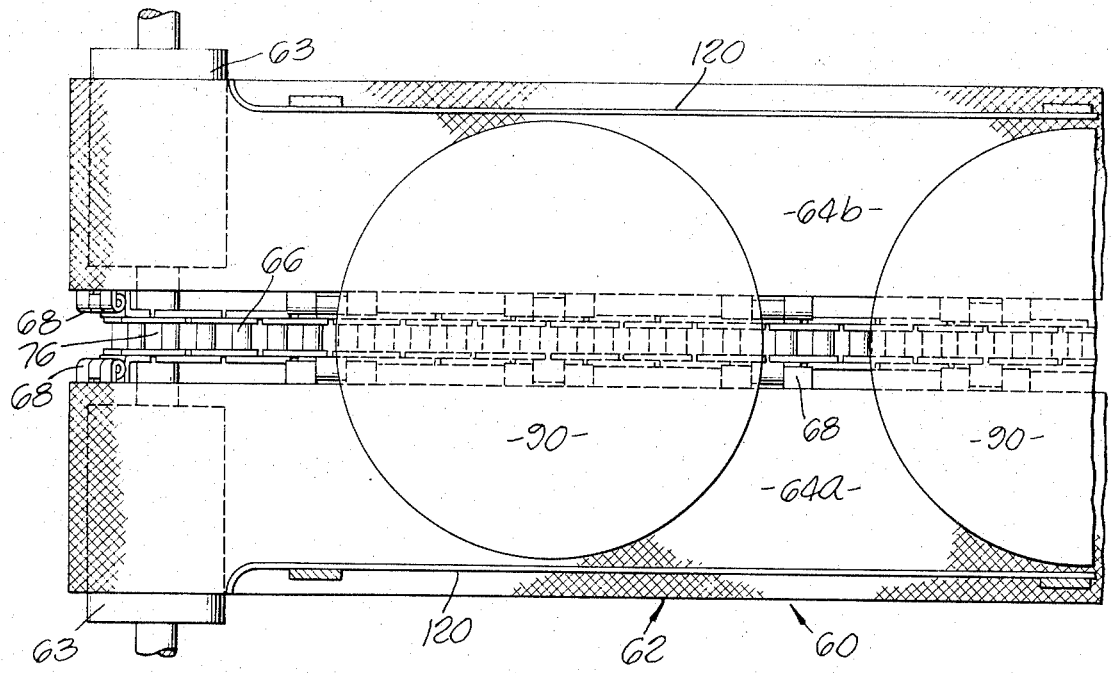
FIG. 2.
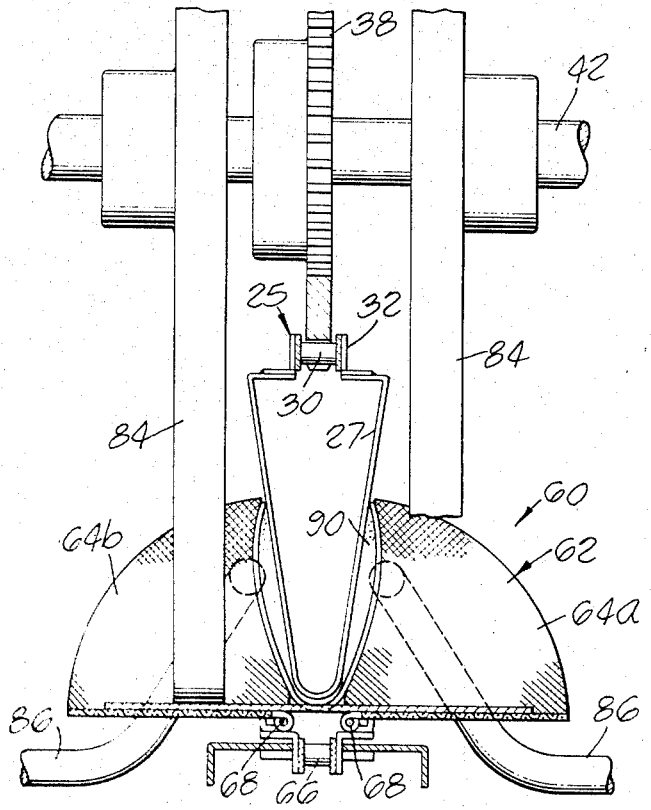
FIG. 3.
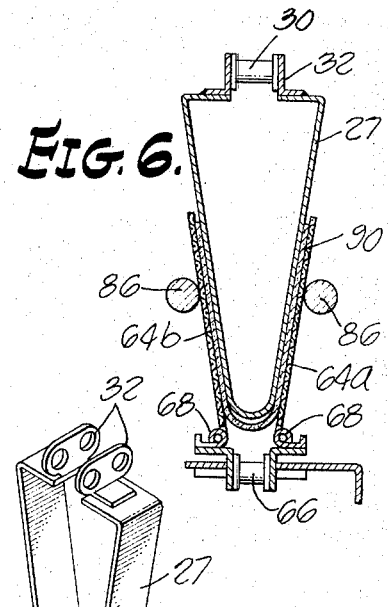
FIG. 6.
FIG. 7.

APPARATUS FOR PREPARING TACO SHELLS

BACKGROUND OF THE INVENTION

1. Field of the Invention

This invention relates generally to an apparatus for heating and forming sheet material and more particularly to a food cooking apparatus for preparing a V-shaped Mexican food product known as a taco shell.

2. Description of the Prior Art

Prior to this invention various types of apparatus for preparing taco shells have been developed. As discussed in my co-pending application, U.S. Ser. No. 55,486 where several prior art devices are identified, a basic problem inherent in these devices is their inability to automatically produce, in a trouble-free manner, large quantities of taco shells of uniform high quality. In addition to the prior art discussed in the above-identified co-pending application, applicant is familiar with the prior art U.S. Letters Pat. to F. R. Schy, No. 3,570,393. The apparatus described by Schy, while representing a notable improvement over many prior art devices for preparing taco shells, is clearly distinguishable from the apparatus of my invention as described and claimed herein. They Schy device, for example, uses a pair of cooperating conveyor belts or webs for transporting the tortilla through the cooking vessel. The Schy conveyor belts, each of which is formed of a plurality of discrete articulated segments, are deformed as they pass through the cooking vessel so as to sandwich the tortillas therebetween, causing them to be formed into the generally V-shaped taco shell cross-sectional configuration. As will become clear from an analysis of the description which follows, an entirely different approach is used in the apparatus of my invention for forming the tortillas. Rather than using cooperating deformable conveyor belts or webs for forming the tortillas, I use a much simpler conveyor system having a plurality of generally V-shaped rigid mold members which carry the tortilla through the preparation cycle and which, in cooperation with a proximately disposed yieldable supporting member, form the tortilla into the V-shaped taco shell cross-sectional configuration Other significant differences between my apparatus and the apparatus of Schy, including the unique means of my invention for removing the taco shells from the cooking vessel, will become apparent from the description which follows.

Taco shells are prepared from a Mexican food product known as a tortilla. The tortilla, which is a flat sheet-like member, must first be gently folded into a generally V-shaped configuration and then carefully cooked in a cooking oil at elevated temperature. After cooking, the taco shell is filled with a food filling commonly consisting of a combination of meat, cheese or other ingredients. Since the taco shell must effectively contain the food filling, while at the same time be easy to bite into and chew, proper consistency of the prepared taco shell is of great importance. If the tortilla is improperly cooked, the resulting taco shell will be unsatisfactory for its intended purpose.

To obtain the desired body and flaky-like consistency required of the taco shell, the tortilla must be prepared under closely controlled conditions. The cooking oil for cooking the tortilla must be maintained at a proper temperature and the cooking time must be carefully regulated. Additionally, it is of utmost importance during the cooking process that the tortilla be uniformly exposed to a free flow of cooking oil over its external surfaces. In the interest of economy and end product uniformity, it is also improtant that the volume of the cavity of the taco shell also be accurately controlled.

A fundamental problem to be solved in developing an apparatus for automatic preparation of taco shells is to provide simple and reliable means for shaping, supporting and protecting the fragile tortilla during cooking without encapsulating it or otherwise inhibiting the free flow of cooking oil over its external surfaces. Most prior art devices fail to satisfactorily accommodate these competing requirements.

One of the most satisfactory prior art devices for automatically producing taco shells of high quality is described in my co-pending application. The apparatus therein described shapes and protects the tortilla during cooking in a highly novel and successful manner. In my invention as disclosed herein, I have developed a new and equally unique means for shaping and supporting the tortilla during cooking without in any way impeding the free circulation of cooking oil over its outer surfaces.

SUMMARY OF THE INVENTION

It is an object of my invention to provide an apparatus for the automatic heating and forming of a sheet material in which the sheet material is automatically carried through a vessel containing a fluid at elevated temperatures and is accurately formed into the desired end product cross-sectional configuration without damaging the material and without inhibiting the free flow of fluid over the surfaces of the material during the heating operation.

It is another object of my invention to provide an apparatus of the type described in the preceding paragraph in which the sheet material is automatically removed from the vessel after the heating operation is transported through a draining cycle wherein the fluid is drained from the material and finally is automatically ejected from the apparatus.

It is a further object of my invention to provide an apparatus which has the ability to handle very fragile and delicate sheet material such as tortillas without tearing or otherwise damaging the material.

It is another object of my invention to provide an apparatus for the automatic preparation of taco shells from uncooked tortillas in which the tortillas are protectively supported in a generally V-shaped configuration of predetermined dimensions while being automatically carried through a cooking vessel containing cooking oil at elevated temperatures.

It is still another object of my invention to provide an apparatus of the aforementioned character in which a conveyor system, which includes a plurality of spaced apart rigid mold elements for forming the tortillas, carries the tortillas through the cooking vessel and in which a flexible endless belt, which is movably synchronously with the conveyor, is adapted to be moved into juxtaposition with the mold members so as to support the tortillas during the cooking operation.

It is a further object of my invention to provide an apparatus of the type described in the preceding paragraph in which there is provided a novel gripping mechanism having a plurality of finger-like elements which gently hold the tortilla in engagement with the mold members as the tortillas are removed from the cooking vessel.

It is another object of my invention to provide an apparatus of the aforementioned character which is highly reliable, safe to operate and easy to clean and maintain.

BRIEF DESCRIPTION OF THE DRAWINGS

FIG. 2 is an enlarged fragmentary plan view of the forward portion of the apparatus taken along lines 2—2 of FIG. 1 showing a tortilla in position at the tortilla introduction station.

FIG. 3 is an enlarged cross-sectional view taken along lines 3—3 of FIG. 1.

FIG. 6 is a fragmentary cross-sectional view taken along lines 6—6 of FIG. 1 showing the sheet material held in juxtaposition with the mold members of the conveyor system.

FIG. 7 is a perspective view of one of the mold members of the conveyor system as it appears when detached from the conveyor chain.

DESCRIPTION OF THE PREFERRED EMBODIMENTS

Figure 1:
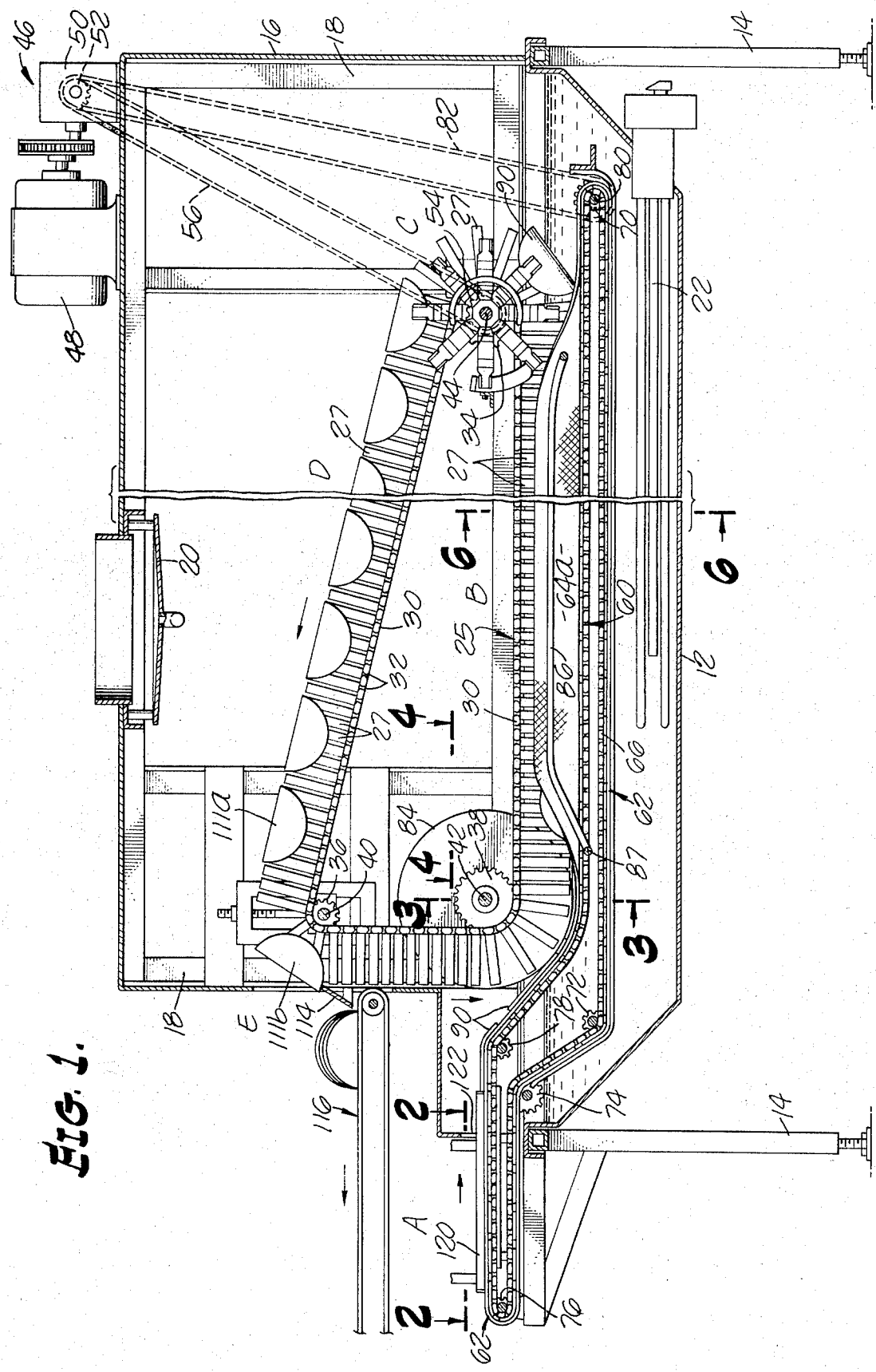
FIG. 1 is a foreshortened side elevational view of one form of the apparatus of my invention for preparing taco shells shown partly in section to illustrate the arrangement of the various elements which cooperate in the preparation process.

Turning now to the drawings, FIG. 1 shows the general arrangement of the cooperating elements of the apparatus of one form of my invention for heating and forming sheet materials. The apparatus as shown in the drawings is specifically designed for preparing taco shells from sheet material in the form of tortillas. For ease of description, the various steps in the process of preparing taco shells using the apparatus shown have been identified as follows: the tortilla introduction station designated generally by the capital letter A; the tortilla cooking cycle B in which the tortilla is formed and cooked; the taco shell removal operation C in which the taco shell is carried upwardly and forwardly of the apparatus; the taco shell draining cycle D in which the cooking oil is allowed to drain from the taco shell; and finally, the ejection station E where the prepared taco shell is ejected from the apparatus for use in preparing tacos.

The numeral 12 identifies a vessel or tank for containing a fluid at elevated temperatures, in this case a suitable type of cooking oil. Cooking vessel 12 is supported on a frame 14 and is enclosed by a hood 16, which in turn is supported by a superstructure 18 carried by frame 14. Hood 16 serves to collect cooking fumes emitted from the cooking oil and is provided with a vent 20 for venting the cooking fumes through a suitable exhaust conduit (not shown) to atmosphere. An electric emersion heater 22 is positioned within vessel 12 to maintain the cooking oil at the desired elevated temperature. While an emersion heater is shown for purposes of illustration, any suitable means for heating the fluid in the tank may be used.

As shown in the central portion of FIG. 1, there is provided a conveyor means, generally designated by the numeral 25, for moving the sheet material, in this case in the form of tortillas, through the cooking cycle B, the removal operation C, the draining cycle D and finally to the ejection station E. Conveyor means 25, in this form of the invention, includes a plurality of spaced apart rigid mold members 27 each having a cross-sectional configuration corresponding to the cross-sectional configuration into which the sheet material is to be formed. As best seen in FIGS. 3, 6 and 7, in this form of the invention mold members 27 are generally V-shaped in cross-sectional configuration and are affixed near their end portions to an endless chain-like member 30 by means of suitably mounting brackets 32.

Referring once more to FIG. 1, chain-like member 30 can be seen to be entrained over a drive sprocket 34, to extend forwardly of the apparatus (to the left in FIG. 1) and upwardly over an idler sprocket 36, thence downwardly under an idler sprocket 38 and finally rearwardly through vessel 12 to drive sprocket 34. Idler sprockets 36 and 38 are suitably mounted on transverse shafts 40 and 42 which are in turn mounted for rotation within suitable bearings (not shown) carried by superstructure 18. Drive sprocket 34 is mounted on a transverse shaft 44 which is rotatably carried by superstructure 18 and which is rotatably driven by a driving means 46. Driving means 46, which is also carried by superstructure 18, is shown here as comprising an electric motor 48 interconnected to a suitable speed reduction mechanism 50 which is in turn drivably connected to shaft 44 by suitable driving sprockets 52 and 54 interconnected by a driving belt or chain 56. By driving shaft 44 in a counterclockwise direction, the conveyor chain along with its outwardly protruding mold members 27, will be caused to be moved in the direction of the arrows of FIG. 1 with the conveyor chain-like member 30 continuously moving into, through and out of the cooking vessel 12. While a chain and sprocket drive arrangement is shown in the drawings, it is to be appreciated that any type driving arrangement such as, for example, a driving cable with cooperating driving and idler sheaves could be used to move the mold members through the sheet material preparation process.

Turning now particularly to FIGS. 2, 3, 4 and 5 of the drawings, the configuration and operation of the support means of the invention are illustrated. The support means, generally designated by the numeral 60, serves to support the sheet material in juxtaposition with the mold members 27 as the material moves through the vessel 12. In this form of the invention, the support means comprises an elongated yieldable member, shown here as an endless belt assembly 62 which is disposed proximate the conveyor means 25 and is adapted to cooperate therewith to form the sheet material, or tortillas, into the desired corss-sectional configuration.

As can best be seen by referring to FIG. 2, belt assembly 62 comprises a pair of endless mesh-like flexible belts 64a and 64b which are connected to a central chain-like member 66 by means of a plurality of hinge elements 68. Belts 64 may be constructed of metal, plastic or any other durable, heat resistant flexible mesh material which will permit the free flow of fluid therethrough. The use of the flexible belts as herein described provides the proper degree of support to the tortillas without in any way inhibiting the free flow of the cooking oil over their outer surfaces. This arrangement has proven to be clearly superior to various prior art techniques in which the tortillas are encapsulated or sandwiched between supporting plates or other rigid members.

Belt assembly 62, as shown in FIG. 1, is continuously driven in a clockwise direction through a vessel 12 by a chain and sprocket drive arrangement which is powered by driving means 46. Central chain-like member 66 of belt assembly 62 can be seen to be entrained under a drive sprocket 70, to extend forwardly of the apparatus in a spaced relationship with the bottom of vessel 12, then under an idler sprocker 72, upwardly over an idler sprocket 74, forwardly around an idler sprocket 76 and then back upon itself over an idler sprocket 78 and finally downwardly into and rearwardly through vessel 12 to the point of beginning at drive sprocket 70. Idler sprockets 72, 74, 76 and 78 are all suitably mounted on transverse shafts which are in turn rotatably carried by vessel 12. Drive sprocket 70 is mounted on a transverse shaft 80 which is also rotatably carried by vessel 12 and which is interconnected by a drive belt or chain 82 to a cooperating sprocket (not shown) driven in a clockwise direction by the previously described speed reduction mechanism 50 of driving means 46. With this arrangment, belt assembly 62 is continuously moved through vessel 12 at a synchronous rate of speed with conveyor means 25 and in close proximity therewith. Roller elements such as those shown as 63 in FIG. 2 are provided on each transverse shaft of the belt assembly to support belts 64a and 64b. It is to be appreciated that, as in the case of the conveyor means previously described, various types of drive arrangements can be used to drive the support means.

Turning to FIGS. 1 and 3, it can be seen that affixed to shaft 42 is a pair of spaced apart pressure wheels or discs 84. These wheels are of such a diameter as to lightly engage mesh belts 64 as the belts move downwardly into vessel 12 at a point near the forward end of the apparatus. As will presently be described, wheels 84 also serve to hold the tortillas in engagement with the support means as they are moved into the cooking cycle B.

Figure 4:
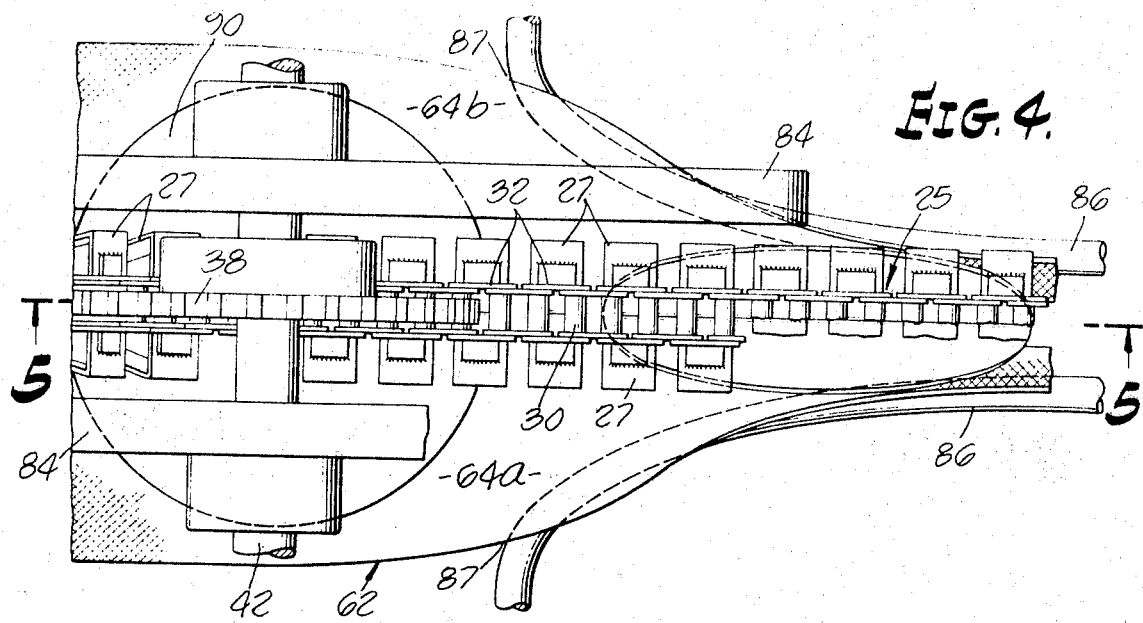
FIG. 4 is an enlarged fragmentary view taken along lines 4—4 looking into the cooking vessel.
Figure 5:
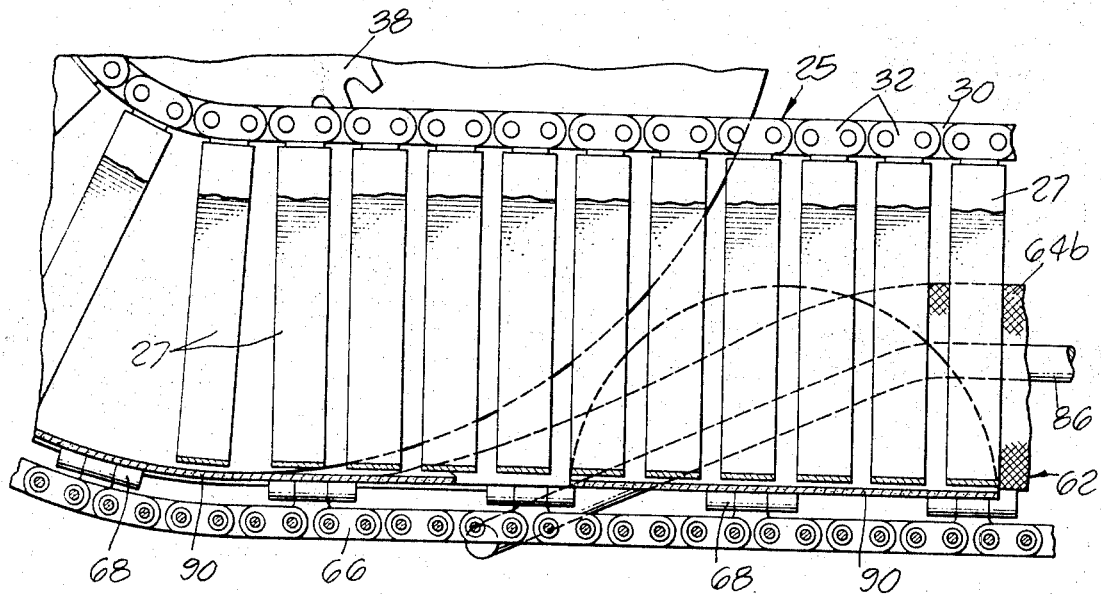
FIG. 5 is an elevational view taken along lines 5—5 of FIG. 4.

Disposed within vessel 12 are guide means for moving the flexible belt assembly of the support means into juxaposition with the mold members 27 as these latter members are moved through the vessel by conveyor chain 30. The interaction between the guide means, which in this form of my invention comprises spaced apart curved guide rods or bars 86, and the supporting belt assembly is best illustrated in FIGS. 3, 4 and 5 of the drawings. As illustrated in these figures, guide bars 86 are mounted within the cooking vessel in a spaced parallel relationship with the longitudinal axis, or center line of travel, of the conveyor means, so that when belt assembly 62 is moved forwardly into the cooking area it reaches a point 87 at which it will engage the spaced apart forward curved ends of guide rods 86. Due to the shape and location of guide bars 86, continued movement of the belt assembly into area B will cause belts 64 to pivot relative to hinge elements 68 and fold upwardly and inwardly into juxtaposition with side panels of mold members 27. The flexible nature of belts 64 coupled with their pivotal action relative to hinge elements 68 allows them and the tortilla which they carry to be gently folded into the position illustrated in FIGS. 4, 5 and 6. Since the support belts and the conveyor means are moving at the same rate of speed, no forces are imposed on the tortillas which might tear or otherwise damage them.

Turning to FIG. 6, the tortilla, designated as 90, is supported in the desired V-shaped orientation illustrated as it moves through the cooking cycle B. Due to preestablished clearances between the various elements of the conveyor means 25 and the support means 60, the tortilla is, in reality, held in a type of "floating" engagement with the mold member. In this way the cooking oil is allowed to flow freely through the belts, around the mold members, and uniformly over and about the external surfaces of the tortilla as it moves through the cooking cycle. It is this unique feature of my invention which permits the tortillas to be properly shaped and adquately protected from damage while they are being cooked without inhibiting the flow of cooking oil over thier outer surfaces which is so essential to quality preparation.

Figure 8:
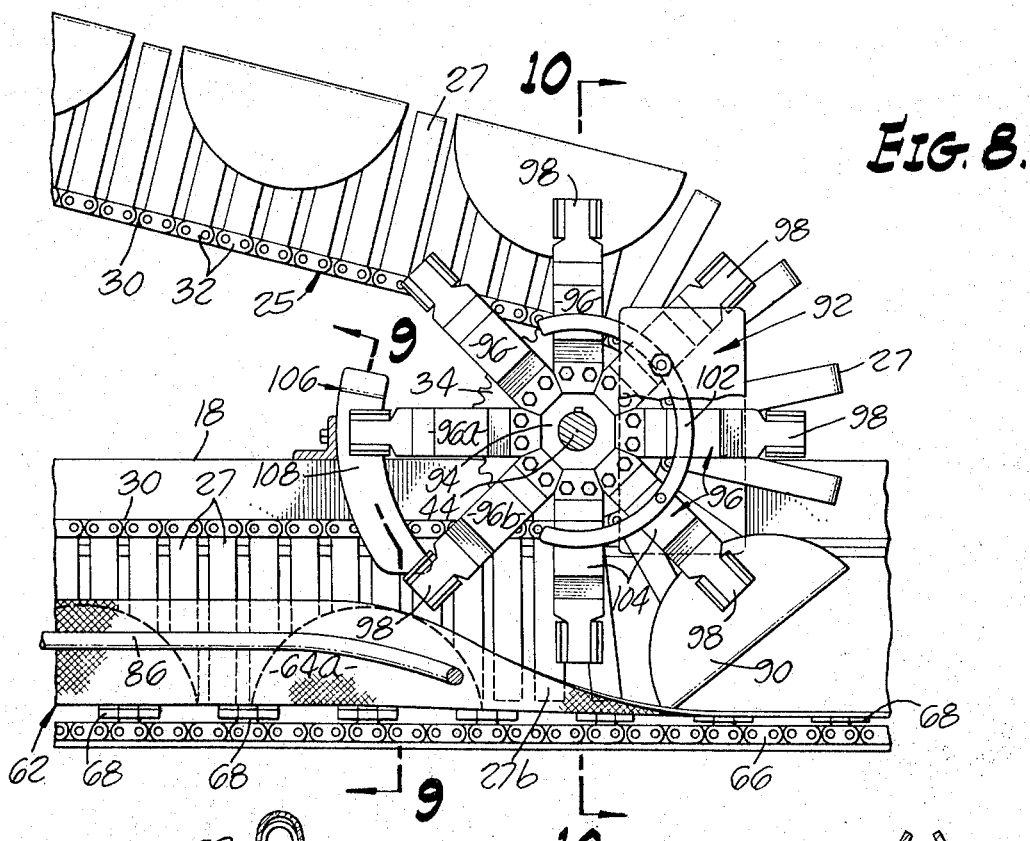
FIG. 8 is a enlarged fragmentary side elevational view of the removing means of the invention illustrating the way in which the sheet material is removed from the cooking vessel.
Figure 10:
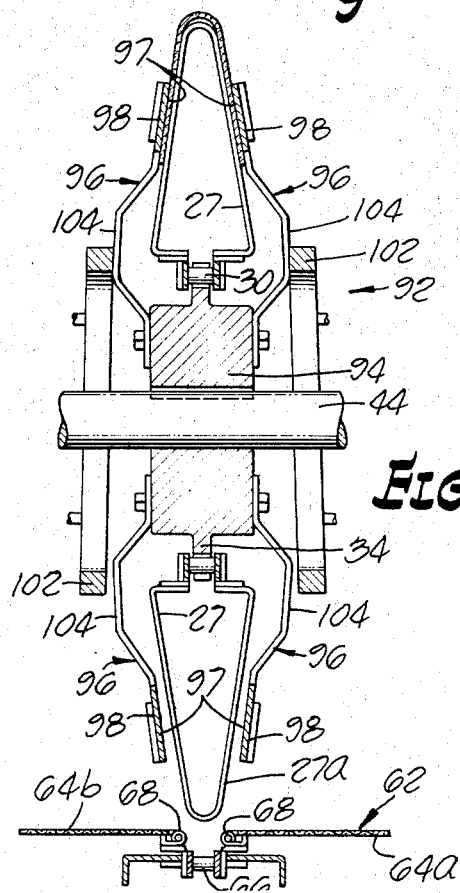
FIG. 10 is a view taken along lines 10—10 of FIG. 8 further illustrating the gripping means of the invention.
Figure 9:
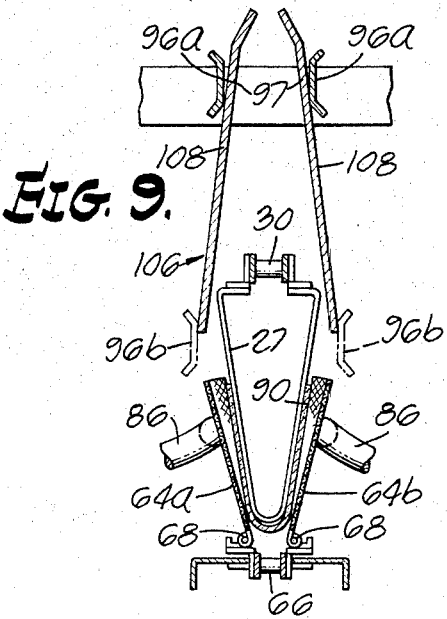
FIG. 9 is a view taken along lines 9—9 of FIG. 8 illustrating the gripping means of the invention.

Turning now to FIGS. 8, 9 and 10 of the drawings, the configuration and operation of the novel material removing means of the invention are illustrated. The removing means, which forms a part of conveyor means 25, performs the important function of gently removing the sheet material from the cooking vessel and moving it smoothly into the draining cycle step of the preparation process. In this form of the invention, the removing means includes gripping means, generally indicated in the drawings by the numeral 92, for holding the sheet material, or tortillas, in engagement with the mold members 27 as the material is removed from the vessel or cooking tank. Referring particularly to FIGS. 8 and 10, gripping means 92 is shown to comprise a hub 94 which is mounted on shaft 44 for rotation therewith. A plurality of circumferentially spaced pairs of yieldable cooperating fingers 96 is affixed to hub 94 and extends outwardly therefrom with the inner surfaces 97 of their outer extremities 98 disposed in a spaced apart relationship and in close proximity with the side walls of adjacent mold members 27.

In order to first yieldably urge together extremities 98 of the gripping fingers so as to gently engage the tortillas and assist in their removal from the vessel, and then to move the extremities of the fingers apart so as to release the tortillas so that they can move freely into the draining cycle D, a unique and unusual camming arrangement has been incorporated in the apparatus. Referring to FIG. 10, the first cam means of the camming arrangement is designed to move the inner surfaces 97 of fingers 96 together toward the mold members, and can be seen to comprise a pair of spaced apart, arcuate ring-like elements 102 carried by superstructure 18. Elements 102 are mounted rearwardly of and concentrically with shaft 44 and lie in upwardly converging planes. At their lower extremities, elements or rings 102 are spaced apart so that the outer surfaces of side portions 104 of fingers 96 will move freely therebetween with the inner surfaces of 97, their end portions 98 slightly spaced apart from the adjacent mold member identified as 27a in FIG. 10. Due to the upward convergence of the planes of ring elements 102, as member 27a moves to the position of the mold member identified in FIG. 8 as 27b, its side portions 104 will move into engagement with the inner surfaces of the ring. Continued movement of the mold member due to the urging of the conveyor chain will cause it to yieldably deform so that the inner surfaces 97 of its end portions 98 will engage the tortilla and compress it lightly against the sides of the mold member. The inner surfaces of the fingers will remain in contact with the tortilla so as to hold it in contact with the mold members adjacent thereto until the mold member move into an upwardly extending attitude where gravity will function to hold the taco shell in position as it proceeds through the draining cycle D.

To spread apart or separate the outer ends of the cooperating fingers so that the gripping process can once again be repeated, a second cam means 106 is provided. This cam means, which also forms a part of the gripping means of the invention, is shown in FIG. 9 of the drawings to comprise, in this embodiment, a pair of spaced apart curved segments 108. Segments 108 are carried by superstructure 18 forwardly of shaft 44 and also lie in upwardly converging planes. The segments are spaced apart at their upper extremities so that the inner surfaces 97 of fingers 96 will move into engagement with the outer surfaces of the segments when the fingers reach the position of the finger identified as 96 in FIG. 8. Due to the convergence of segments 108, as the gripping means rotates, finger 96a will continue to be yieldably spread apart until the finger reaches the position of finger 96b as shown in FIG. 8. Upon clearing segments 108, the fingers will assume the configuration of the lowermost finger of FIG. 10 and the gripping operation can once again be repeated.

It is to be noted that, as a tortilla is removed from the cooking vessel in the manner just described, belt assembly 62 continues to move rearwardly relative to guide bars 86. When the belt assembly reaches the end of guide bars 86, belts 64, due to the urging of gravity, will pivot relative to hinge elements 68 and will move into a generally horizontal orientation which enables them to pass around driving sprocket 54 and once again move forwardly of the apparatus in the direction indicated by the arrows in FIG. 1.

By the time the taco shells which have been removed by the removing means reach the position illustrated by taco shell 111a in FIG. 1, the cooking oil will have drained from them and they will have cooled sufficiently to maintain their V-shape. As the taco shells continue to move around idler sprocket 36 toward ejection point E and reach the position illustrated by taco shell 111b, they will tend by gravity to fall free of mold members 27. At this point the leading edge of the taco shell strikes an ejecting means in the form of element 114 which is adapted to flip or eject the taco shell from the apparatus, wings up, onto a transporting means which comprises a removal conveyor 116. Removal conveyor 116 is adapted to remain stationary until a predetermined number of taco shells is stacked together thereon, at which time a weight-sensitive switching means (not shown) will activate the conveyor to transport the prepared taco shells away from the apparatus for use or packaging.

BRIEF SUMMARY OF THE OPERATION OF THE APPARATUS

With conveyor means 25 in operation and the cooking oil in cooking vessel 12 at the proper elevated temperature, the operator starts the taco shell preparation cycle by placing an uncooked tortilla on belt assembly 62 at station A. As shown in FIG. 2, a pair of aligning members 120 is provided to correctly center the tortilla on belt assembly 62. Belt assembly 62 carries the tortilla into the hood 16 through aperture 122 downwardly into cooking vessel 12, where it is brought into frictional engagement with pressure wheels 84. These wheels serve to hold the tortilla in place against belts 64 as it moves downwardly into vessel 12. When belt assembly 62 moves forwardly into engagement with guide bars 86, mesh belts 64 will urge the tortilla into juxtaposition with the adjacent mold members 27. The tortillas will be supported in this position through the cooking cycle B. Upon reaching station C they will be removed from the cooking vessel by the removing means and then will be carried by members 27 through the draining cycle D to ejection station E where they will be ejected from the apparatus.

I claim:
1. An apparatus for heating and forming a sheet material comprising:
   a. a vessel for containing a fluid at elevated temperatures;
   b. a conveyor means for moving the sheet material through said vessel, including a plurality of spaced apart rigid mold members having a cross-sectional configuration generally corresponding to the cross-sectional configuration into which the sheet material is to be formed; and
   c. support means for supporting the sheet material in juxtaposition with said mold members as the sheet material moves through the vessel, said support means comprising an elongated yieldable member disposed proximate said conveyor means and adapted to cooperate therewith to form the sheet material into the desired cross-sectional configuration.

2. The apparatus as defined in claim 1 in which said yieldable member is in the form of an endless belt assembly which is movable at a synchronous speed with said conveyor means and in which the apparatus includes guide means disposed within said vessel and adapted to cooperate with said endless belt means to move it into juxtaposition with said mold members as said sheet material moves through said vessel.

3. The apparatus as defined in claim 2 in which said belt means comprises a pair of endless mesh like flexible belts connected together by a plurality of hinge elements.

4. The apparatus as defined in claim 2 in which said guide means comprises a pair of elongated curved guide bars mounted within said vessel in a spaced parallel relationship with the longitudinal axis of said conveyor means.

5. The apparatus as defined in claim 2 in which said conveyor means includes removing means for removing the sheet material from said vessel.

6. The apparatus as defined in claim 5 in which said removing means includes gripping means for holding the sheet material in engagement with said mold members as the sheet material is removed from said vessel.

7. The apparatus as defined in claim 6 in which said gripping means comprises:
   a. a rotatable hub;
   b. a plurality of circumferentially spaced pairs of yieldable, cooperating fingers extending outwardly from said rotatable hub, the outer extremities of said fingers being disposed in close proximity with said mold members;

c. a first cam means for moving the outward extremities of said fingers toward said mold members; and d. a second cam means for separating the outward extremities of said fingers.

8. An apparatus for preparing taco shells from uncooked tortillas comprising:

a. a cooking vessel;

b. a conveyor means for moving the tortillas through said cooking vessel, said conveyor means comprising a plurality of spaced apart, generally V-shaped rigid mold members;

c. support means for supporting the tortilla in juxtaposition with said rigid mold members as the tortilla is moved through the cooking vessel, said support means comprising a flexible endless belt disposed proximate said conveyor means and movable synchronously therewith; and d. guide means mounted within said cooking vessel for cooperation with said endless belt to move it into juxtaposition with said mold members as said tortilla is moved through said cooking vessel.

9. The apparatus as defined in claim 8 in which said conveyor means includes an endless chain-like member to which said mold members are affixed and drive means for moving said chain-like member continuously into, through and out of said cooking vessel.

10. The apparatus as defined in claim 9 in which said drive means also drives said support means continuously through said cooking vessel.

11. The apparatus as defined in claim 9 in which said conveyor means includes gripping means for holding the tortillas in engagement with said mold means as said endless belt moves out of said cooking vessel.

12. The apparatus as defined in claim 11 in which said gripping means comprises:

a. a hub rotatably driven by said driving means;

b. a plurality of circumferentially spaced fingers extending outwardly from said hub, the outward extremities of said fingers being disposed in close proximity with said mold members;

c. a first cam means for yieldably moving the outward extremities of said fingers toward said mold members; and d. a second cam means for yieldably moving the outward extremities of said fingers apart.

13. The apparatus as defined in claim 8 including ejecting means for ejecting prepared taco shells from the apparatus.

14. The apparatus as defined in claim 13 including transport means for transporting the prepared taco shells away from the cooking vessel for packaging.

* * * * *